Aug. 14, 1951      E. G. SEED      2,563,965
CONVEYER BELT FEED
Filed March 12, 1949      2 Sheets-Sheet 1
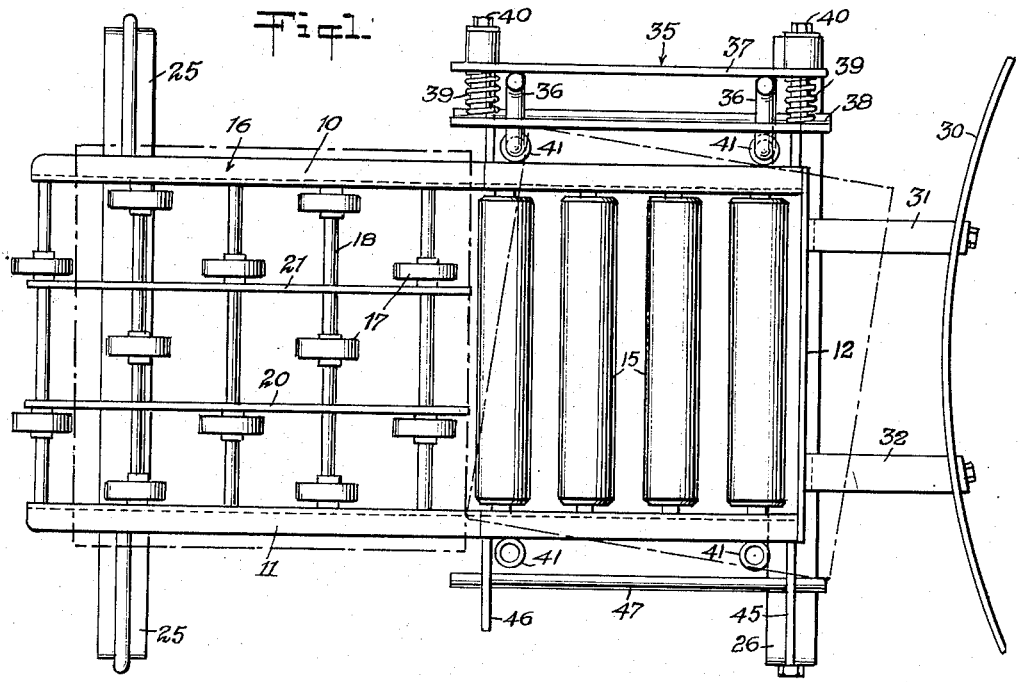
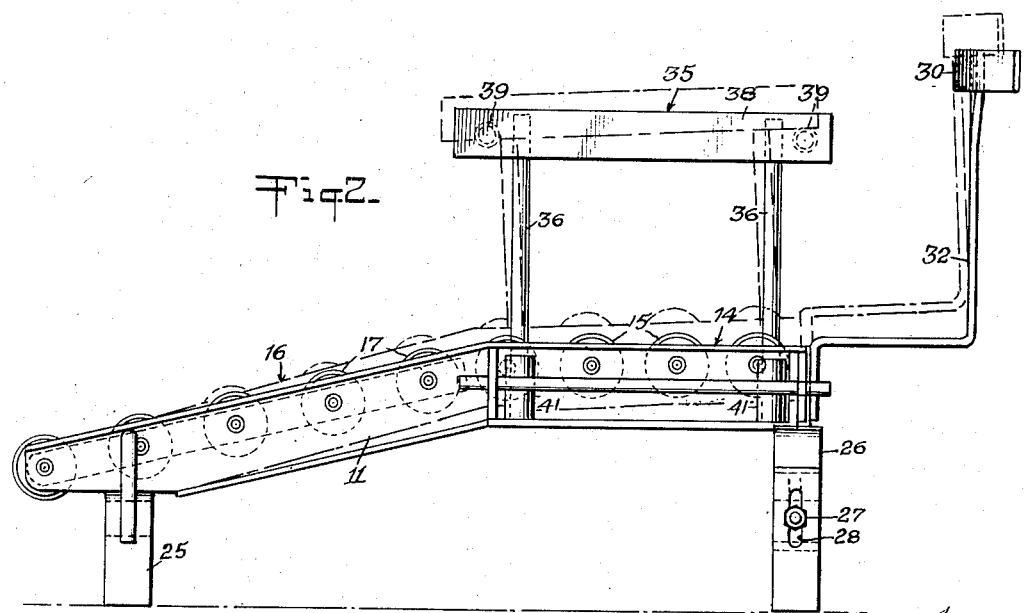
Inventor
Everett Glenn Seed
By
Munn, Liddy & Glaccum
Attorneys Aug. 14, 1951  E. G. SEED  2,563,965
CONVEYER BELT FEED
Filed March 12, 1949  2 Sheets-Sheet 2
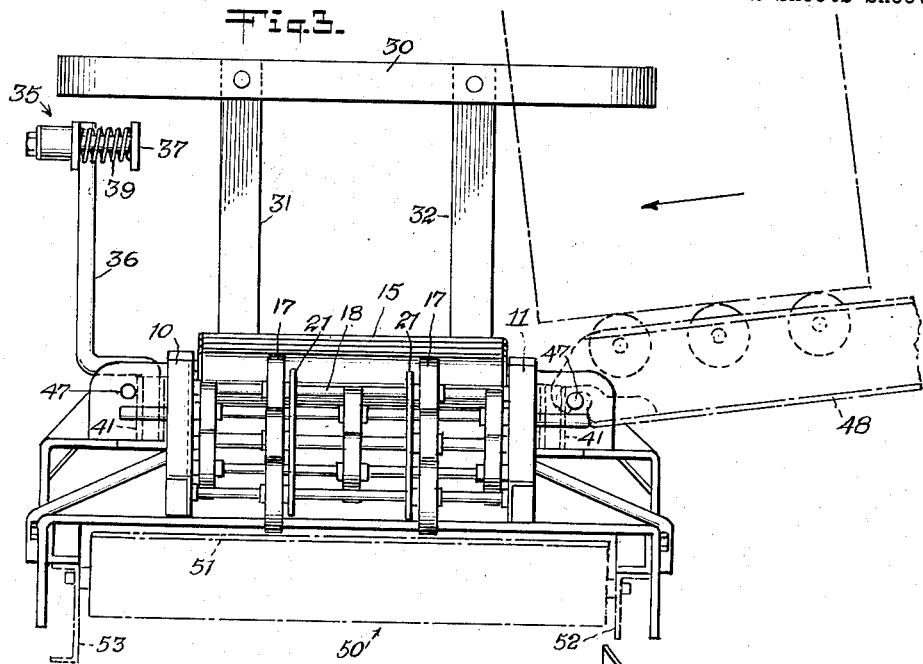
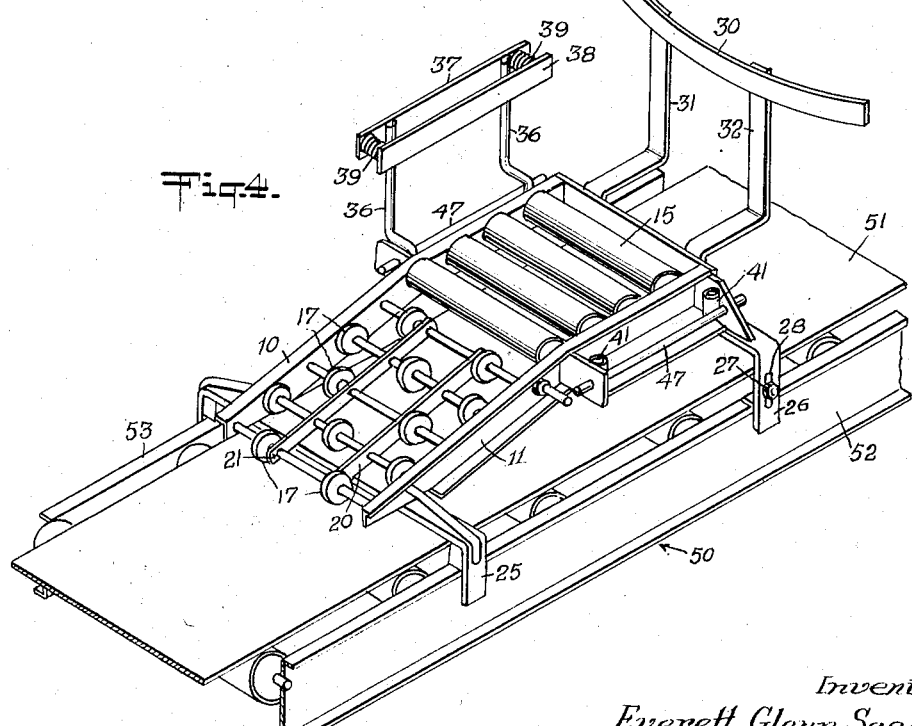
Inventor
Everett Glenn Seed
By
Munn, Liddy & Glaccum
Attorneys Patented Aug. 14, 1951

2,563,965

UNITED STATES PATENT OFFICE 2,563,965

CONVEYER BELT FEED

Everett Glenn Seed, Robinson, Ill., assignor to The Ohio Oil Co., Findlay, Ohio, a corporation of Ohio Application March 12, 1949, Serial No. 81,153

3 Claims. (Cl. 198—52)

This invention relates to conveyor belts and more particularly to a portable and reversible conveyor belt angle gravity feed.

The purpose of the invention is to provide a transfer device to load objects onto a power driven conveyor belt from a gravity roller conveyor placed at right angles thereto.

A further object is to provide a portable and reversible device which can bridge a conveyor belt at any point and which can be used on either side of the conveyor belt. In warehouses and similar places cartons, packages and other objects are usually stored in aisles. While the conveyor belt will run along the main aisle, it has been necessary to bring the material out to the conveyor belt or to station a man at the end of the aisle to place the material on the belt. With the present invention the gravity feed roller conveyor, portable in nature, can be set up in the loading aisle, cartons or packages placed thereon to be fed automatically onto the main conveyor belt.

Other objects and advantages of my invention become apparent from the accompanying drawings and as the description proceeds.

Referring more particularly to the drawings—

Fig. 1 is a top plan view of a transfer device embodying my invention.

Fig. 2 is a side elevation thereof.

Fig. 3 is an end view.

Fig. 4 is a perspective view of my device when placed upon a conveyor belt.

My device consists of a pair of channel members 10 and 11 connected at one end by an end plate 12. The channel members 10 and 11 are built so as to provide a section 14 in which are mounted a series of rollers 15 and a section 16 provided with a series of conveyor rollers 17 mounted on roller axles 18. A pair of spacer bars 20 and 21 are also provided to form rigidity to the section. Said section 14 may be operated at an angle inclining downwardly toward section 16.

Adjacent the lower end of the transfer device is a lower supporting bracket 25, and a corresponding bracket 26 is provided at the upper end. The bracket 26 may be adjustable by means of the bolt 27 in the slot 28 and varies the height of the section 14. Mounted in the upper end of the device is a guide bracket 30 which may be arcuate in shape and which is supported on the end plate 12 and the bracket 26 by means of the bars 31 and 32.

Removably mounted on the side of the section 14 is the bumper assembly 35 consisting of the supporting rods 36, the plate 37 and the bumper plate 38. The bumper plate is separated from the plate 37 by means of springs 39 slidably mounted on the bolts 40. The supporting rods 36 are positioned in the bumper sockets 41, there being a pair of these on either side of the structure so that the bumper may be reversed. Adjacent the bracket 26 is a support 45 which cooperates with a similar support 46 to position the rod 47. A similar structure is provided on the opposite side of the device. The purpose of the rod 47 is to support a gravity conveyor 48 as shown in Fig. 3. As shown in Fig. 4, the entire device may be set astride a power driven conveyor 50 having a moving belt 51 by placing the support brackets 25 and 26 on the side channels 52 and 53 of the moving conveyor. The gravity roller conveyor 48 may be hooked into the rod 47 and merchandise rolling down the gravity feed conveyor may be guided by the guide bracket 30 and the bumper assembly 35 onto the rollers 15 from where it will proceed to the conveyor rollers 17 and onto the moving belt. As the cartons or other objects slide off the gravity roller conveyor 48 onto the rollers 15, they come into contact with the guide bracket 30 and the bumper assembly 35, both of which are so positioned as, by their cooperative action, to impart to said cartons or other material a thrust in the direction of and onto the gravity conveyor rollers 17.

It will be appreciated that while the preferred embodiment of my invention is shown, many modifications may be made without departing from the spirit of my invention.

I claim:

1. A conveyor belt feed comprising channel members, rollers mounted in said channel members, brackets supporting said channel members, two of which brackets are adjustable to vary the height of a portion of said channel members, a bumper assembly removably mounted on any one channel member, an end plate and a guide bracket mounted on said end plate.

2. A conveyor belt feed comprising channel members, rollers mounted in said channel member, a bumper assembly comprising supporting rods, a plate and bumper plate separated by springs slidably mounted on bolts; supports, rods positioned by said supports, said bumper assembly being removably mounted on any one of said rods, an end plate, a guide bracket mounted on said end plate, and brackets supporting said channel members, some of which brackets are adjustable to vary the height of a portion of said channel members.

3. An endless conveyor belt feed having channel members, rollers mounted in said channel members, brackets mounting said conveyor belt feed upon an endless belt frame, a pair of rods one on each side of said feed adapted to engage a conveyor at right angles to the first mentioned endless belt conveyor, a bumper assembly including a pair of plates operated by springs removably mounted adjacent said rods and a guide member at right angles to said bumper assembly, said bumper assembly being mountable on either side of said conveyor belt feed.

EVERETT GLENN SEED.

REFERENCES CITED

The following references are of record in the file of this patent:

UNITED STATES PATENTS

| Number | Name | Date |
| --- | --- | --- |
| 1,034,641 | Parker | Aug. 6, 1912 |
| 1,050,478 | Lister | Jan. 14, 1913 |
| 1,299,927 | Pilley | Apr. 8, 1919 |
| 1,401,372 | Sutherland | Dec. 27, 1921 |
| 1,435,263 | Soubier | Nov. 14, 1922 |